United States Patent Office 3,560,454
Patented Feb. 2, 1971

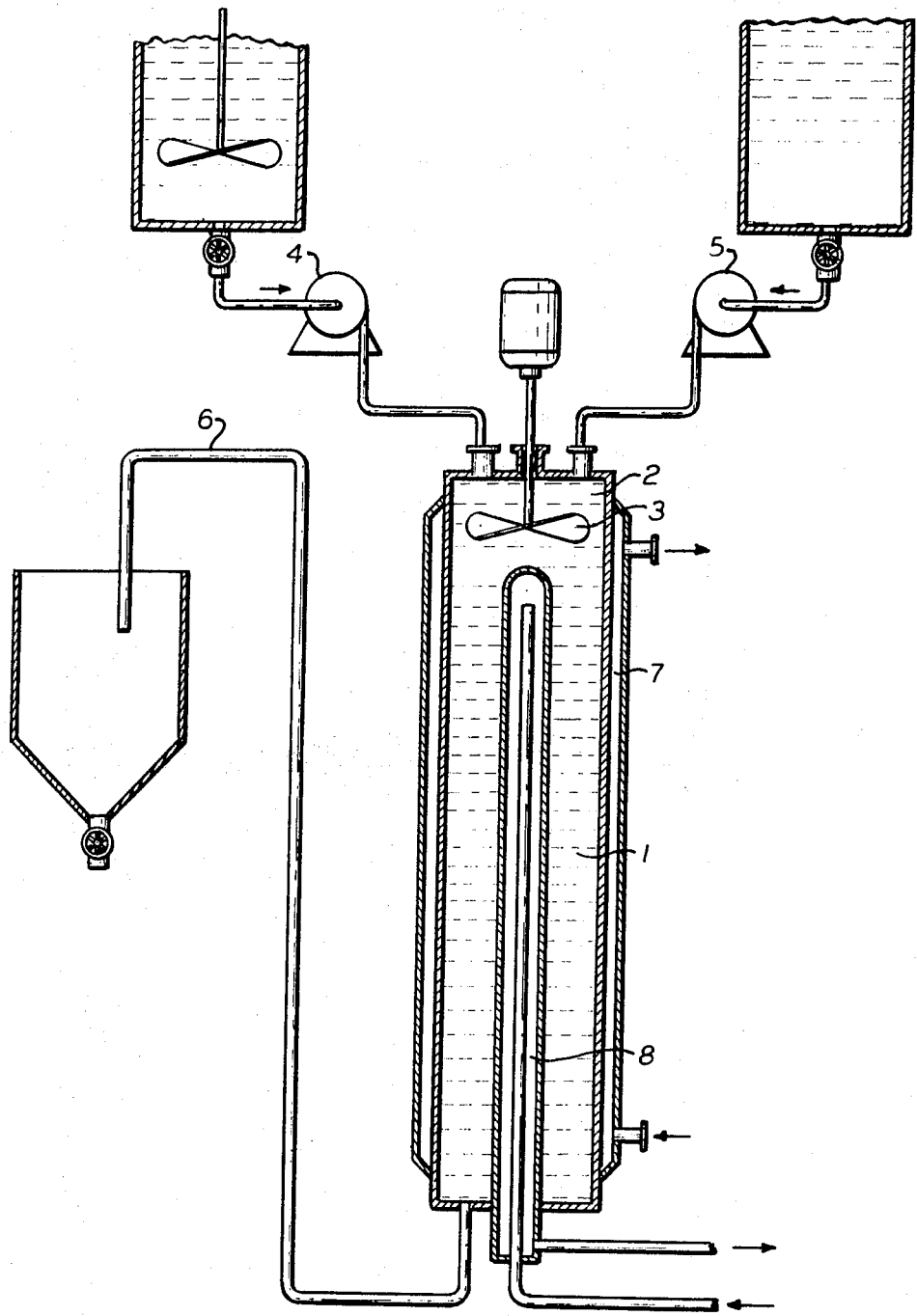

3,560,454
PROCESS FOR THE CONTINUOUS POLYMERIZATION AND COPOLYMERIZATION OF ETHYLENICALLY UNSATURATED COMPOUNDS
Robert Büning, Oberlar-Troisdorf, and Karl-Heinz Diessel, Nienburg (Weser), Germany, assignors to Dynamit Nobel Aktiengesellschaft, Troisdorf, Germany, a corporation of Germany
Filed Dec. 16, 1968, Ser. No. 784,495
Claims priority, application Germany, Dec. 20, 1967, P 17 20 524.2
Int. Cl. C08f 1/62, 1/98
U.S. Cl. 260—78.4        14 Claims

ABSTRACT OF THE DISCLOSURE

Improvements in the process for continuously polymerizing or copolymerizing in emulsion, ethylenically unsaturated monomers using redox systems as catalysts comprising continuously polymerizing or copolymerizing the monomer or comonomers at a temperature of from 80° C. to —40° C. in an annular gap column having a mixing chamber arranged preceding the column, the suspension which is thereby obtained being removed continuously through an overflow apparatus.

---

This invention relates to a continuous catalytic polymerization process and more particularly has to do with a continuous process for polymerizing or copolymerizing ethylenically unsaturated monomers using redox systems as catalysts.

The continuous polymerization and copolymerization of ethylenically unsaturated compounds is in the prior art. For example, it is known to polymerize ethylenically unsaturated compounds continuously in emulsion using therefor polymerization vats or vessels connected in series and transferring the polymerization mixtures from one vat into the next succeeding vat of the series and there polymerizing the materials further. This continuous procedure offers no important advantages over a discontinuous one, particularly because of the fact that the investment in apparatus is quite high.

Attempts have therefore been made to carry out an emulsion polymerization in a vessel provided with an especially constructed stirrer (German Pat. 1,071,341) under conditions whereby so-called "Taylor rings" are produced by the stirring, as a flow pattern in the emulsion. In this procedure, however, it is easy for the individual strata of different degrees of polymerization within the emulsion to intermix, so that the uniform polymerization that is required for a continuous process does not result.

The above-mentioned intermixing is to a great extent prevented in a process and an apparatus which are described in German Pat. 1,217,069, which teaches the use of a rotation-symmetrical reaction chamber which is divided by rotation-symmetrical bodies into chambers, the chambers being connected one to the other by small apertures, and permitting the reaction mixture to flow only in the main direction of flow of the material being polymerized. The division of the reaction chamber into numerous cylindrical subdivisions by means of rotating disks mounted on a shaft, however, involves considerable technical expense.

In accordance with the invention it has now been found that intermixing is entirely prevented in a technically simple and economically feasible manner by carrying out the continuous emulsion polymerization or copolymerization of ethylenically unsaturated monomers at a temperature of from 80° C. to —40° C. in an annular gap column, using redox systems as the catalyst and continuously removing the suspension which is thereby obtained through an overflow apparatus.

The use of redox system catalysts assures a high rate of polymerization. It has been found in accordance with the invention that the polymerization rate has to be sufficiently high that an approximately 100% conversion will take place in about 15 to 90 minutes, the optimum time amounting to about 60 minutes. If the polymerization time exceeds 90 minutes, some intermixing occurs, and where it is less than 15 minutes, the annular gap has to be made very small in order to be able to carry off the heat liberated in the polymerization that the technical expense becomes too great. However, if the clusters of annular gaps are properly designed, the removal of the heat of polymerization is technically possible under these conditions.

It has furthermore been found that premature polymerization is most advantageously prevented by feeding an aqueous or aqueous-organic solution of one component of the redox system separately into the reactor. Because of the high polymerization rate that is required, the proportioning of the individual components of the polymerization mixture can be carried out, for example, as follows: the monomers, emulsifiers, reducing agents, activators and other ingredients such as buffers and emulsion stabilizers, are drawn off from a supply tank through a metering pump and delivered to the antechamber of the annular gap column, the oxidizer, preferably diluted with water, being simultaneously delivered by a metering pump from a second supply tank into the antechamber of the annular gap column. The annular gap column itself is first filled with a previously prepared emulsion of the polymer, i.e., this emulsion has previously been prepared by a discontinuous process. The individual components are mixed in the antechamber by a slowly rotating blade stirrer, so that a thorough mixing is assured.

An overflow draws off the same amount of emulsion as is being pumped in by the metering pumps. To determine whether any intermixing occurs, the precharged emulsion is colored with a dye. The thusly colored emulsion moves with a sharp boundary line as the product is discharged, in other words, no intermixing occurs. The length of the colored emulsion can also be calculated on the basis of the volume drawn off, and these results will agree wtih the length actually measured. If intermixing is prevented, the annular gap column can be operated continuously always resulting in the production of uniform polymer having reproducible qualities and characterized by an especially uniform degree of polymerization and particle size, and similar working characteristics. Because of the high rates of polymerization that are required, the precise composition of most polymerization batches is very difficult to determine discontinuously, even in the laboratory as then the heat of polymerization can hardly be dissipated. The determination of composition and of the rate of polymerization is therefore carried out directly in the annular gap column.

The principal redox systems involved as catalysts for use in the process of the invention are those which consist of a heavy metal salt, a water-soluble per compound and a reducing agent, as for example hydrogen peroxide, ascorbic acid and iron sulfate. It is possible to substitute persulfates for the hydrogen peroxide, to replace the ascorbic acid with isoascorbic acid, dioxymaleic acid or methylreductic acid, or with inorganic reducing agents such as hydrazine or the like, and to replace the iron sulfate with other iorn, cobalt or nickel salts. The high rate of polymerization is the result of the starting materials (such as the ratio of monomers to water) and particularly of the ratio of reducing agent to oxidant and the concentrations thereof, and of the concentration of the activator (heavy metals salts such as iron sulfate).

Utilizing the "color test" described above, it is possible to determine the optimum composition in a very simple manner. This is described in the examples which follow. Aside from these measures, which may be desirable for the purpose of increasing the rate of polymerization, the polymerization is otherwise carried out in emulsion according to the prior-art methods.

Both anionic and cationic or non-ionic emulsifiers can be used. Examples of suitable emulsifiers include the fatty alcohol sulfates and sulfonates, alkylsulfonates and aralkylsulfonates, fatty acid esters and salts, and polyethers.

It is advantageous to coordinate the time the emulsion takes to pass through the annular gap column with the time required for 100% polymerization, the throughput time being the same as the polymerization time, or from slightly longer, to twice as long. If, for example, a 100% polymerization is achieved in 20 (or 40) minutes, the time of stay in the annular gap column will be adjusted to 25 to 35 minutes (40 to 60 minutes).

These conditions apply particularly to average annular gaps widths of 10 to 30 mm. The gap width, however, may also be smaller, i.e., down to 2 mm. and less (particularly for low throughput velocities) or it may amount to as much as 100 mm. and more.

The emulsion or dispersion, as the case may be, which has been prepared by this method, can be used as it is, or it can be further prepared by coagulation, precipitation with acid, spray drying "in vacuo," etc.

The polymeric or copolymeric materials produced are advantageously used for the identical purposes as such materials which have been prepared by the known method. According to the present invention, the process can be carried out at conventional temperatures of from 80° C. down to —40° C. Particularly advantageous temperatures are beolw room temperature down to —40° C. Temperatures of from 10° C. down to —20° C. are preferred. The process of the invention is applicable to the polymerization of ethylenically unsaturated compounds, including vinyl, vinylidene and acrylic compounds, such as vinyl chloride, vinylidene chloride, acrylic acid esters, as for instance, acrylic acid ethyl ester, acrylic acid isooctyl ester, methacrylic acid esters such as methacrylic acid methyl ester, acrylic acid or acrylonitrile. Illustrative of the monomers which are suitable for copolymerization with the monomers as set out above, which of course can be copolymerized with one another, are the following: vinyl esters such as vinyl acetate, vinyl propionate, vinyl stearate, vinyl ethers, maleic acid esters, fumaric acid esters, olefins as for instance ethylene and propylene, itaconic acid esters, and the like. The selection of the monomer is governed particularly by the rate of polymerization. However, the rate of polymerization can be adapted in the present invention by proper selection of the initiator, and can be determined by a series of tests which are known and can be carried by those skilled in the art.

Where polymerization temperatures of below 0° C. are involved antifreezing agents can be added in the known manner, as for example, in the form of univalent or polyvalent alcohols.

The following examples are given in order to illustrate the invention but are in nowise to be construed in limitation thereof.

The examples were carried out in the annular gap column shown in the drawing, the essential features of which were the cooling jackets 7 and cooling cores 8. The annular gap had an outside diameter of 70 mm. and an inside diameter of 50 mm., providing a gap width of 20 mm. The height amount to 1030 mm. situated above the annular gap was the mixing chamber 2 which was provided with a stirrer 3. The mixing of the polymerization batch components as set out in the following examples was carried out using a paddle agitator at 25 r.p.m. All of the procedures in the examples were carried out under nitrogen, in order to substantially eliminate the presence of oxygen.

EXAMPLE 1

The annular gap was cooled both inside and out with water having a temperature of 14° C. The annular gap and the mixing chamber were then filled to the overflow mark with a previously prepared, dyed (methyl red) emulsion of a copolymer comprising 88% vinylidene chloride and 12% methacrylic acid methyl ester by weight having a solids content of about 53 g. per 100 cc. Thereafter the following carefully mixed components were metered per hour continuously into the mixing chamber using a metering pump 4: 540 g. vinylidene chloride, 60 g. methacrylic acid methyl ester, 532 g. boiled water, 24 g. emulsifier K 30 (mixture of paraffin sulfonates having an average chain length of 14 to 15 carbon atoms), 12 g. ascorbic acid and 12 cc. of 1% iron sulfate solution. Simultaneously the metering pump 5 continuously delivered 188 g. of boiled water and 12 cc. of $H_2O_2$ (in the form of a solution of 35% by weight) per hour into the mixing chamber.

The emulsion overflowed through the overflow tube 6 as the fresh components were fed in, the interface between the fresh emulsion and the colored starting emulsion moving downwardly as the fresh components were fed in. No intermixing of the colored and the color-free emulsion took place.

In order to determine the optimun feeding rate, samples of 100 cc. each of emulsion were removed after 1.5 hours and every hour thereafter. 75 cc. of concentrated hydrochloric acid and 75 cc. of water were added to the samples in order to coagulate it. The precipitated polymer was then separated by suction filtering, washed with water and dried at 50° C.

The results of the analyses are set out in Table I which follows:

TABLE I

| Specimen | Percent Cl | Weight (g.) |
|---|---|---|
| 1 | 64.5 | 52.5 |
| 2 | 64.5 | 53.0 |
| 3 | 64.4 | 52.5 |
| 4 | 64.5 | 52.0 |
| 5 | 64.6 | 53.0 |
| 6 | 64.5 | 53.0 |

In a similar manner, three of the above-described annular gap columns each having a 20 mm. gap width were used in series. Components in amounts as above set out could then be added in 15 to 20 minutes instead of an hour, with the same satisfactory results.

When a similar technical annular gap column having a gap width of 38 mm. and a height of 1950 mm. was used, five to six times the amount of components could be charged through per hour, with the quality of the polymer remaining completely uniform.

Similar results were obtained using 560 g. of vinylidene chloride and 40 g. of acrylic acid methyl ester, or 600 g. of vinylidene chloride alone.

EXAMPLE 2

Example 1 was repeated excepting that the above-described mixtures were fed in continuously over a period of 30 minutes. The results which were obtained were analogous and no intermixing occurred.

EXAMPLE 3

Example 1 was repeated with the difference that the above-described mixtures were continuously charged over a period of 20 minutes. The analyses of the samples showed a lower solids content of about 46 g. of polymer per 100 cc. of emulsion. The emulsion heated up during this procedure due to post-polymerization. The rate of feed was therefore too high. By further experimentation the optimum time was found to be about 24 minutes for the mixture described. If, for example, the concentration of the emulsifier was changed, this time period no longer applied. When the concentration was lowered, the time required was extended under the above conditions. The time required can easily be determined by a series of experiments of the type which have been described above.

EXAMPLE 4

This example is an example of continuous polymerization carried out below the freezing point of water.

The procedure followed was the same as set out in the examples set out above. The annular gap was maintained at −16° C. using therefore a refrigerator unit and brine. Metering pump I was used to deliver the following quantities per hour to the mixing chamber at a temperature of −16° C.: 600 g. vinyl chloride, 300 g. water, 232 g. methanol, 24 g. K–30, 12 g. ascorbic acid, 12 cc. 1% iron sulfate solution. Metering pump II delivered the following quantities per hour: 108 g. of water, 80 g. of methanol and 12 cc. of hydrogen peroxide.

As in Examples 1 and 3, no intermixing took place.

EXAMPLE 5

Example 4 was repeated but at a polymerization temperature of 14° C. using 550 g. vinyl chloride and 50 g. vinyl acetate in place of 600 g. vinyl chloride. A polymer of constant and reproducible quality was obtained.

EXAMPLE 6

Example 4 was repeated again but at a temperature of 5° C., with the addition of the mixtures as set out in Example 4 over a period of 40 minutes. Similar results to those set out were achieved.

What is claimed is:
1. In the continuous catalytic emulsion polymerization or copolymerization of ethylenically unsaturated monomers using redox systems as catalysts, the steps which comprises:
   (a) continuously introducing the monomer into the mixing zone of an elongated column having an axially disposed tube positioned therein defining an annular gap between said tube and the wall of the column, the tube extending from one end of the column and terminating short of the other end thereof providing at said other end said mixing zone, said mixing zone including the entire cross-section of said column,
   (b) introducing the oxidizing and reducing components of the redox system separately into said mixing zone,
   (c) agitating the materials in the mixing zone to form a mixture of the monomer and redox system components,
   (d) passing said mixture from the mixing zone into and through the annular gap without intermixing in the annular gap,
   (e) polymerizing the monomer in emulsion as the mixture passes through the annular gap, and
   (f) continuously withdrawing at said one end of the column the emulsion formed and containing the polymerization product.

2. Improvement according to claim 1 which comprises carrying out said polymerization at a temperature of from room temperature to −40° C.

3. Improvement according to claim 1 which comprises carrying out said polymerization at a temperature of from 10° C. to −20° C.

4. Improvement according to claim 1 wherein a temperature of less than 0° C. is used and there is additionally present an antifreezing agent.

5. Improvement according to claim 4 wherein said antifreezing agent is a monovalent or polyvalent alcohol.

6. Improvement according to claim 1 wherein said ethylenically unsaturated monomer is at least one member selected from the group consisting of vinyl and vinylidene compounds, acrylic acid esters, methacrylic acid esters, acrylic acid, methacrylic acid, acrylonitrile, methacrylonitrile, maleic acid esters, fumaric acid esters, olefins and itaconic acid esters.

7. Improvement according to claim 1 wherein said redox system consists of a heavy metal salt, a water-soluble per compound and a reducing agent.

8. Improvement according to claim 1 wherein as emulsifier a member selected from the group consisting of anionic, cationic and non-ionic emulsifiers is used.

9. Improvement according to claim 1 which comprises coordinating the time required for passage through said polymerization zone with the time required for 100% polymerization.

10. Improvement according to claim 9 which comprises utilizing a time for passage through said polymerization zone equal to up to twice as long as required for 100% polymerization.

11. Process according to claim 1, wherein said polymerization product is 100% polymerized.

12. Process according to claim 1, wherein the polymerization time is about 15 to 90 minutes.

13. Process according to claim 11, wherein the polymerization time is about 15 to 90 minutes.

14. Process according to claim 1, wherein the reducing component and monomer mixed together in an aqueous medium are introduced into said mixing zone, and as a separate stream the oxidizing component in an aqueous medium is introduced into the mixing zone.

References Cited

UNITED STATES PATENTS

| | | | |
|---|---|---|---|
| 2,384,277 | 9/1945 | Calcott et al. | 260—95X |
| 2,394,291 | 2/1946 | Calcott et al. | 260—95X |
| 3,049,519 | 8/1962 | Reynolds | 260—84.1 |

JOSEPH L. SCHOFER, Primary Examiner

J. KIGHT III, Assistant Examiner

U.S. Cl. X.R.

260—78.5, 80.3, 85.5, 85.7, 86.1, 86.3, 87.1, 87.3, 87.5, 87.7, 88.7, 93.7, 94.9, 95